A. DRUMMOND.
SLIDE REST OF LATHES.
APPLICATION FILED JULY 27, 1921.
1,426,365.
Patented Aug. 22, 1922.
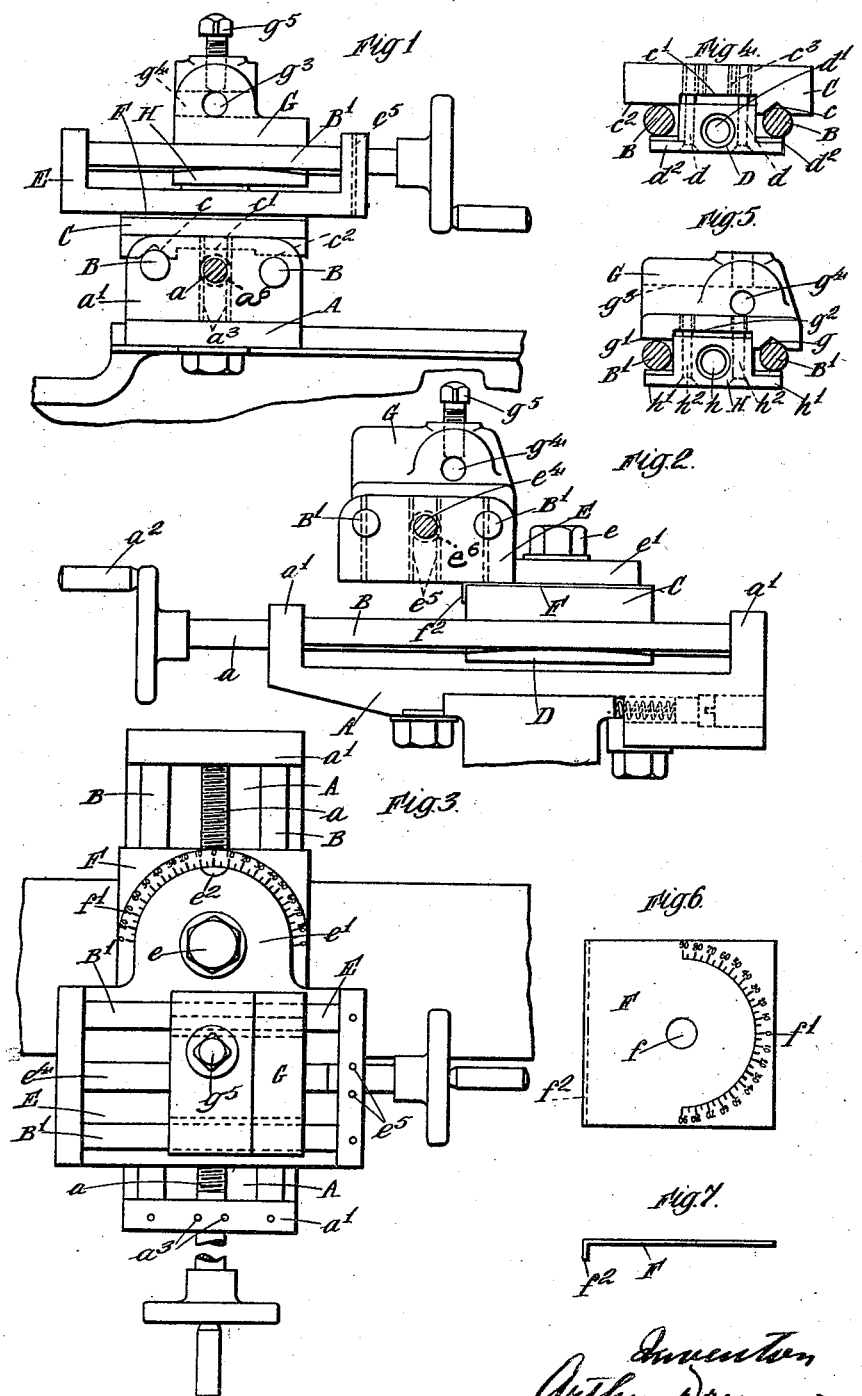

UNITED STATES PATENT OFFICE.

ARTHUR DRUMMOND, OF RYDE'S HILL, NEAR GUILDFORD, ENGLAND.

SLIDE REST OF LATHES.

1,426,365.

Specification of Letters Patent. Patented Aug. 22, 1922.

Application filed July 27, 1921. Serial No. 487,982.

(GRANTED UNDER THE PROVISIONS OF THE ACT OF MARCH 3, 1921, 41 STAT. L., 1313.)

*To all whom it may concern:*

Be it known that I, ARTHUR DRUMMOND, a subject of the King of Great Britain, residing at Ryde's Hill, near Guildford, in the county of Surrey, England, have invented certain new and useful Improvements in or Relating to the Slide Rests of Lathes (for which I have filed an application in Great Britain July 12, 1919, Patent No. 144,496), of which the following is a specification.

This invention relates to the slide rests of lathes, including the cross or middle slide and top slide or tool holder, and has for its chief object to construct these parts in a manner which allows of maximum economy of manufacture and enables accurate workmanship and fitting to be dispensed with while providing for reasonable accuracy in operation. The improvements are especially designed for small and cheap lathes where it is essential that hand labour in fitting shall be reduced to a minimum.

According to the main feature of this invention the sliding member (either the middle or top slide or both) is formed underneath with a single V groove at one side and a flat surface at the other and is adapted to slide at the said groove and surface respectively upon a pair of round guide rods fitted on the carrying member. By employing a single V groove and a flat surface no accurate fitting is needed, as the actual guiding is effected by one only of the guide rods acting through the V groove and the other rod merely keeps the sliding member level and may make contact with any part of the flat surface.

As applied to the mounting of the cross slide on the main slide the table of the cross slide is formed with the V groove and flat surface and a central recess receiving the tapped base or clamp plate, which is secured to the table by screws and through which passes the screw effecting the movements of the cross slide, the clamp plate extending under the guide rods to hold the table in place. The body of the cross slide is mounted in an angularly adjustable manner upon the table, between the body and the table being placed a thin brass or other graduated plate secured by bending down one edge over the edge of the table and by the bolt of the slide passing through it.

The top slide or tool holder is similarly guided by a pair of rods between the holder and a tapped clamp plate.

In order that the said invention may be clearly understood and readily carried into effect the same will now be described more fully with reference to the accompanying drawings, in which:—

Figure 1 is a front elevation; Figure 2 a side elevation and Figure 3 a plan of the slide rest of a lathe including the saddle, middle slide and top slide fitted in accordance with this invention.

Figure 4 is a front view of the table of the cross slide with its clamp plate,

Figure 5 is an end view of the top slide with its clamp plate; and

Figures 6 and 7 are respectively a plan and edge view of the graduated plate.

A is the main slide or saddle provided with a pair of guide rods B. C is the middle or cross slide table mounted upon the rods B and held upon them by the clamp plate D. E is the body of the cross slide mounted upon the table C by means of the bolt $e$ which passes through the lug $e'$ at the front of the body E, the bolt forming a fulcrum around which the slide can turn. F is the graduated plate. G is the top slide.

The cross slide table C can be conveniently made by cutting into short lengths a long bar shaped in a single length by a milling or other machine so as to form at the under surface the V groove $c$, the central recessed part $c'$ and the flat bearing surface $c^2$ at the opposite side to the groove, the surface and groove being so related that when the table is supported upon the guide rods B it will be level. The clamp plate D projects into the recess $c'$ and is secured in place by two pairs of screws $d$ at each side of the central tapped hole $d'$ through which passes the screw $a$ belonging to the saddle A, the screw being supported in the end lugs $a'$ of the saddle. On the front end of the screw is a handle $a^2$ by which it is turned to move the cross slide to and fro along the saddle. The screws $d$ are tightened up just sufficiently to cause a slight grip upon the rods B without hindering the movement of the cross slide and to render the action as smooth as possible the sides $d^2$ of the clamp plate are slightly rounded at the upper face as shown in Figures 2 and 4. The saddle A is formed with holes which allow of the removal and insertion of the screws $d$ when the cross slide is brought into a convenient position.

The table C is provided with the tapped central hole $c^3$ into which the bolt $e$ screws, the head of the bolt bearing through a washer on the upper side of the semi-circular lug or flange $e'$ below which is the graduated plate F. As shown in Figures 6 and 7 this plate is formed with a central hole $f$ through which the bolt $e$ passes and the graduations $f'$ are arranged in a semi-circle concentric with the bolt hole. To secure the graduated plate with a minimum of labour and with sufficient accuracy it is made slightly longer than the table C so as to project at one side. To prevent it turning on the table it is laid in position and a swage having a central stud and a lip at one side is placed upon it with the stud in the bolt hole of the table and the swage is then given a blow causing the projecting edge of the plate to be bent over in the form of a lip or flange $f^2$. The plate is therefore prevented from turning by the downwardly projecting flange so formed and when the slide body E is placed in position the angle to which it is adjusted can be read with considerable accuracy by means of a mark $e^2$ on the lug $e'$ and the graduations $f'$ of the plate F. The graduations can be stamped upon the plate.

The top slide or tool holder G is guided in a similar manner to the cross slide by means of a pair of rods B′ on the cross slide, the top slide being formed at its under side with a V groove $g$ and flat surface $g'$ separated by a recess $g^2$. The slide G is held on the rods B′ by its clamp plate H provided with the tapped hole $h$ through which the screw $e^4$ of the cross slide passes. The clamp plate H is, as in the case of the clamp plate D, made with sides $h'$ having a slightly curved upper surface and is secured to the top slide by the screws $h^2$. The cross slide is formed with holes giving access from below to the screws $h^2$.

The top slide is cast as a single block with a lug or boss on its upper side having a pair of holes $g^3$, $g^4$ at right angles to each other, adapted to receive the tool either for turning or boring according to the hole $g^3$ or $g^4$ employed. A set screw $g^5$ in the boss of the holder at the point of crossing of the holes serve to secure the tool in place.

To allow of economical fitting of the screws $a$ and $e^4$ they are turned with small grooves $a^6$ and $e^6$ just beyond the end of the screwed portion, as shown in dotted lines in Figures 1 and 2, respectively, and a pair of pins $a^5$, $e^5$ are driven into pin holes in the bearing member (either the cross slide or the saddle), the pins when in position engaging in the small groove at opposite sides. The screws are therefore held in place in their respective slides. The handles of the screws $a$, $e^4$ are as shown fitted to small discs and these are preferably secured by simply driving them on to slightly coned surfaces at the outer ends of the screws.

What I claim and desire to secure by Letters Patent of the United States is:—

1. In a lathe, a slide having underneath at one side a single groove and at the other side a flat bearing surface, a carrying member, and a pair of round guide rods fitted to the said carrying member, one of said rods adapted to enter loosely the said groove of the sliding member, and the other rod adapted to support the said flat bearing surface.

2. In a lathe, a slide having underneath at one side a flat bearing surface, a clamping plate having outwardly projecting sides secured to the bottom of said slide, a carrying member, a pair of round guide rods in said member, said rods loosely engaging said projecting sides to permit the slide to be movably secured to said carrying member.

3. In a lathe, a cross slide, a sliding table upon which the cross slide is mounted in an angularly adjustable manner, a securing bolt and a graduated plate showing the angular adjustment, which plate is secured between the slide and the table and is provided with a lip bent down over the edge of the table to prevent turning of the plate.

4. In a lathe, a cross slide, a sliding table upon which the cross slide is mounted in an angularly adjustable manner, a securing bolt and a graduated plate showing the angular adjustment, which plate is secured between the slide and the table and is provided with a lip bent down over the edge of the table to prevent turning of the plate, a slide rest, a pair of round rods fitted horizontally in the said slide rest, a groove in the underside of the cross slide table at one side thereof and a flat bearing surface at the other side, the said groove and flat surface sliding upon the said pair of round rods.

5. In a lathe, a slide having its under surface provided with a V-shaped groove and a flat bearing surface separated by a central recess portion, a carrying member having a pair of round guides mounted therein, and a clamp plate secured to said slide provided with means engaging said guide rods for slidably securing the parts together.

6. In a lathe, a slide having its under surface provided with a central recess, a V-shaped groove on one side of said recess, and a flat bearing surface in the other side thereof, a clamp secured to the bottom of said slide, a carrying member, a pair of guides in said carrying member, one of which is adapted to contact with said V-shaped groove and the other with the said bearing surface, and means on said clamp for slidably securing the said slide to the carrying member.

7. In a lathe, a slide having its under surface provided with a central recess, a V-shaped groove on one side of said recess, and a flat bearing surface in the other side thereof, a clamp secured to the bottom of said slide provided with projecting sides, a carrying member, a pair of guides in said carrying member, one of which is adapted to contact with said V-shaped groove and the other with the said bearing surface, said guides engaging said projecting sides to permit the parts to be slidably secured together.

ARTHUR DRUMMOND.